(12) United States Patent
Li

(10) Patent No.: US 10,956,648 B2
(45) Date of Patent: Mar. 23, 2021

(54) SYSTEMS AND METHODS FOR DESIGNING DUMMY PATTERNS

(71) Applicant: YANGTZE MEMORY TECHNOLOGIES CO., LTD., Wuhan (CN)

(72) Inventor: Bi Feng Li, Wuhan (CN)

(73) Assignee: YANGTZE MEMORY TECHNOLOGIES CO., LTD., Wuhan (CN)

( * ) Notice: Subject to any disclaimer, the term of this patent is extended or adjusted under 35 U.S.C. 154(b) by 162 days.

(21) Appl. No.: 16/297,529

(22) Filed: Mar. 8, 2019

(65) Prior Publication Data

US 2020/0242211 A1 Jul. 30, 2020

Related U.S. Application Data

(63) Continuation of application No. PCT/CN2019/073488, filed on Jan. 28, 2019.

(51) Int. Cl.
*G06F 30/398* (2020.01)
*G06F 30/392* (2020.01)
*G06F 111/20* (2020.01)

(52) U.S. Cl.
CPC .......... *G06F 30/398* (2020.01); *G06F 30/392* (2020.01); *G06F 2111/20* (2020.01)

(58) Field of Classification Search
CPC .... G06F 30/39; G06F 30/398; G06F 2111/20; G06F 30/347; G06F 30/392

(Continued)

(56) References Cited

U.S. PATENT DOCUMENTS 9,431,310 B2 8/2016 Kuboi et al.
2002/0157076 A1* 10/2002 Asakawa .......... H01L 21/31053
438/626

(Continued)

FOREIGN PATENT DOCUMENTS

CN 1453849 A 11/2003
CN 101178744 A 5/2008

(Continued)

OTHER PUBLICATIONS

International Search Report issued in corresponding International Application No. PCT/CN2019/073488, dated Nov. 1, 2019, 4 pages.

(Continued)

*Primary Examiner* — Paul Dinh
(74) *Attorney, Agent, or Firm* — Bayes PLLC

(57) ABSTRACT

Systems and methods for designing a dummy pattern layout for improving surface flatness of a wafer are provided. An exemplary system includes at least one processor and at least one memory storing instructions. The instructions, when executed by the at least one processor, cause the at least one processor to perform operations. The operations include identifying a feature pattern corresponding to a functional region of the wafer. The operations also include determining a property of the feature pattern based on a script associated with the feature pattern. The operations further include determining a dummy pattern rule based on the property of the feature pattern. Moreover, the operations include generating a dummy pattern corresponding to a vacant region of the wafer by wrap-filling dummy units in an adjacent area surrounding the feature pattern based on the dummy pattern rule.

20 Claims, 5 Drawing Sheets

(58) Field of Classification Search
USPC .................................................. 716/110, 119
See application file for complete search history.

(56) References Cited

U.S. PATENT DOCUMENTS

| | | | |
|---|---|---|---|
| 2009/0008803 A1 | 1/2009 | Hou | |
| 2009/0317749 A1 | 12/2009 | Lee | |
| 2010/0287520 A1* | 11/2010 | Nitta | G06F 30/39 |
| | | | 716/130 |
| 2013/0001772 A1 | 1/2013 | Koide et al. | |

FOREIGN PATENT DOCUMENTS

| | | |
|---|---|---|
| CN | 102129169 A | 7/2011 |
| CN | 102799060 A | 11/2012 |
| CN | 103226624 A | 7/2013 |
| CN | 103441096 A | 12/2013 |
| CN | 104050309 A | 9/2014 |
| WO | 2008/029611 A1 | 3/2008 |

OTHER PUBLICATIONS

Written Opinion of the International Searching Authority issued in corresponding International Application No. PCT/CN2019/073488, dated Nov. 1, 2019, 4 pages.

* cited by examiner

SYSTEMS AND METHODS FOR DESIGNING DUMMY PATTERNS

CROSS REFERENCE TO RELATED APPLICATION

This application is continuation of International Application No. PCT/CN2019/073488, filed on Jan. 28, 2019, entitled "SYSTEM AND METHODS FOR DESIGNING DUMMY PATTERNS," which is hereby incorporated by reference in its entirety.

BACKGROUND

Embodiments of the present disclosure relate to computer assisted design-for-manufacturing (DFM) and electronic design automation (EDA) in semiconductor design, and more particularly, to application of dummy patterns in semiconductor design such as three-dimensional (3D) memory device design.

DFM refers to a process of designing or engineering a product in light of facilitating the manufacturing process in order to reduce its manufacturing costs. DFM will allow potential problems to be fixed in the design phase which is the least expensive place to address them. In semiconductor industry, DFM involves defining clearance and/or tolerance among parts and components of a semiconductor device, ensuring flatness of interfaces between layers, etc.

DFM is often implemented using EDA tools, which include software tools for designing electronic systems such as integrated circuits and printed circuit boards. The tools work together in a design flow that chip designers use to design and analyze entire semiconductor chips. Since a modern semiconductor chip can have billions of components, EDA tools are essential for their design.

SUMMARY

In one example, a system is provided for designing a dummy pattern layout for improving surface flatness of a wafer. The system may include at least one processor and at least one memory storing instructions. The instructions, when executed by the at least one processor, may cause the at least one processor to perform operations. The operations may include identifying a feature pattern corresponding to a functional region of the wafer. The operations may also include determining a property of the feature pattern based on a script associated with the feature pattern. The operations may further include determining a dummy pattern rule based on the property of the feature pattern. Moreover, the operations may include generating a dummy pattern corresponding to a vacant region of the wafer by wrap-filling dummy units in an adjacent area surrounding the feature pattern based on the dummy pattern rule.

In another example, a method is provided for designing a dummy pattern layout for improving surface flatness of a wafer. The method may include identifying a feature pattern corresponding to a functional region of the wafer. The method may also include determining a property of the feature pattern based on a script associated with the feature pattern. The method may further include determining a dummy pattern rule based on the property of the feature pattern. Moreover, the method may include generating a dummy pattern corresponding to a vacant region of the wafer by wrap-filling dummy units in an adjacent area surrounding the feature pattern based on the dummy pattern rule.

In a further example, a non-transitory computer-readable medium is provided.

The non-transitory computer-readable medium may store a set of instructions. The instructions, when executed by at least one processor of an electronic device, may cause the electronic device to perform a method for designing a dummy pattern layout for improving surface flatness of a wafer. The method may include identifying a feature pattern corresponding to a functional region of the wafer. The method may also include determining a property of the feature pattern based on a script associated with the feature pattern. The method may further include determining a dummy pattern rule based on the property of the feature pattern. Moreover, the method may include generating a dummy pattern corresponding to a vacant region of the wafer by wrap-filling dummy units in an adjacent area surrounding the feature pattern based on the dummy pattern rule.

BRIEF DESCRIPTION OF THE DRAWINGS

The accompanying drawings, which are incorporated herein and form a part of the specification, illustrate embodiments of the present disclosure and, together with the description, further serve to explain the principles of the present disclosure and to enable a person skilled in the pertinent art to make and use the present disclosure.

Figure 1A:
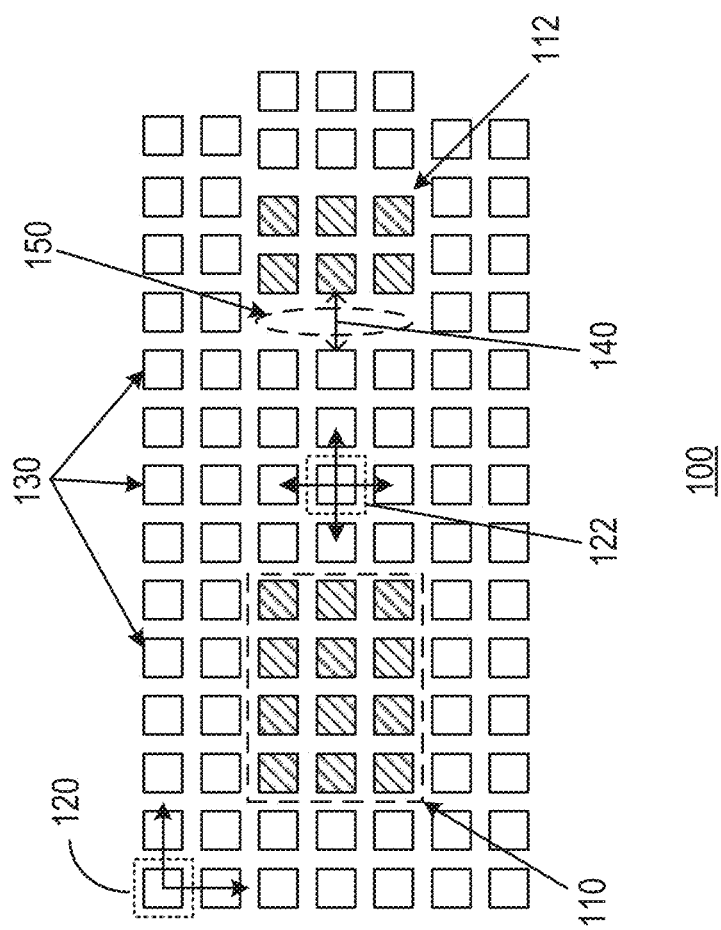
FIG. 1A illustrates related art in dummy pattern design.

Embodiments of the present disclosure will be described with reference to the accompanying drawings.

DETAILED DESCRIPTION

Although specific configurations and arrangements are discussed, it should be understood that this is done for illustrative purposes only. A person skilled in the pertinent art will recognize that other configurations and arrangements can be used without departing from the spirit and scope of the present disclosure. It will be apparent to a person skilled in the pertinent art that the present disclosure can also be employed in a variety of other applications.

It is noted that references in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure or characteristic is described in connection with an embodiment, it would be within the knowledge of a person skilled in the pertinent art to effect such feature, structure or characteristic in connection with other embodiments whether or not explicitly described.

In general, terminology may be understood at least in part from usage in context. For example, the term "one or more"

as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

It should be readily understood that the meaning of "on," "above," and "over" in the present disclosure should be interpreted in the broadest manner such that "on" not only means "directly on" something but also includes the meaning of "on" something with an intermediate feature or a layer therebetween, and that "above" or "over" not only means the meaning of "above" or "over" something but can also include the meaning it is "above" or "over" something with no intermediate feature or layer therebetween (i.e., directly on something).

Further, spatially relative terms, such as "beneath," "below," "lower," "above," "upper," and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As used herein, the term "substrate" refers to a material onto which subsequent material layers are added. The substrate itself can be patterned. Materials added on top of the substrate can be patterned or can remain unpatterned. Furthermore, the substrate can include a wide array of semiconductor materials, such as silicon, germanium, gallium arsenide, indium phosphide, etc. Alternatively, the substrate can be made from an electrically non-conductive material, such as a glass, a plastic, or a sapphire wafer.

As used herein, the term "3D memory device" refers to a semiconductor device with vertically oriented strings of memory cell transistors (also referred to as "memory strings," such as NAND memory strings) on a laterally-oriented substrate so that the memory strings extend in the vertical direction with respect to the substrate. As used herein, the term "vertical/vertically" means nominally perpendicular to the lateral surface of a substrate.

In 3D memory device fabrication, a chemical mechanical polishing/planarization (CMP) process is often used to remove excess conductive and/or dielectric materials from the wafer surface and/or to smooth the wafer surface. The CMP process uses an abrasive and corrosive chemical slurry in conjunction with a polishing pad and retaining ring, typically of a greater diameter than the wafer. The pad and wafer are pressed together by a dynamic polishing head and held in place by the retaining ring. The dynamic polishing head is rotated with different axes of rotation to remove materials and tends to even out any irregular topography, making the wafer flat or planar.

In practice, CMP processes often cause erosion (e.g., to dielectric materials) and dishing (e.g., to metal) due to over-polishing. Erosion and dishing cause non-uniformity on the surface of the wafer. Some processes in semiconductor device (e.g., 3D memory device) fabrication, such as hybrid bonding, require a high degree of uniformity on the bonding interface, thereby susceptive to the adverse effects of erosion and dishing. It is difficult for current systems to meet the high degree of uniformity required by such processes. Therefore, in order to improve the bonding performance, it is needed to reduce the adverse effects caused by erosion and dishing and to improve the surface flatness of the wafer. Embodiments of the present disclosure provide systems and methods that address the aforementioned problems.

The erosion and dishing effects depend on the uniformity of patterns formed on the wafer. A pattern refers to an arrangement of parts or components of a semiconductor device, including, for example, conductive and/or dielectric materials deposited on a substrate or formed on a layer above the substrate, metal traces interconnecting semiconductor components within one layer or across multiple layers, etc. Some functional parts or components occupy a region of a semiconductor wafer, exhibiting a pattern consisting of various shapes, such as lines, blocks, spots, segments, etc. Such a region of the wafer may be referred to as a functional region, and the pattern may be referred to as a feature pattern or design pattern, indicating that the pattern embodies the design features associated with the underlying semiconductor device, such as a 3D memory device.

Because feature patterns normally do not occupy the entire surface area of a wafer, the vacant regions, due to the lack of feature patterns, would cause large density changes if left unsettled, thereby causing erosion and dishing problems. To reduce the erosion and dishing effects, dummy patterns are added to the vacant regions to bridge the discontinuity between feature patterns. FIG. 1A illustrates an exemplary scheme for adding dummy patterns in the vacant regions of a wafer according to related art. Referring to FIG. 1A, an area 100 (e.g., a cell) on the wafer surface may contain a first feature pattern 110 and a second feature pattern 112. Each feature pattern may include a plurality of feature units represented by shadowed blocks. A feature unit may include any type of functional component, such as a portion of a conductive or dielectric material, a segment of a metal trace, or the like. It is noted that a feature unit may take any shape and size, not necessarily as square blocks shown in FIG. 1A. Dummy patterns are represented using blank blocks in FIG. 1A, including a plurality of dummy units 130 (also referred to as dummies for simplicity). A dummy unit may be made of any suitable material (e.g., dielectric, conductive, etc.) and may take any shape and size. Therefore, it is understood that the square blocks shown in FIG. 1A are exemplary and for illustration purpose only.

In the exemplary scheme shown in FIG. 1A, dummy patterns are formed by filling dummy units within area 100 from a predetermined starting location, such as a corner location 120 or a center location 122. For example, dummy units may be filled starting from corner location 120 of area 100 (e.g., a cell on the wafer) toward an opposite corner location in a row-by-row or column-by-column fashion. In another example, dummy units may be filled starting from center location 122 of area 100 toward the boundary, again in a row-by-row or column-by-column fashion. When the dummy units are filled to a region close to a feature pattern, certain placement restrictions may be checked and satisfied, such as the minimum clearance between the dummy units and the feature units. Because dummy units are filled from a fixed location, without taking into consideration the locations of the feature patterns, large gaps between dummy and feature patterns may occur. For example, assume that dummy units in FIG. 1A are filled from corner location 120 column-by-column and proceed from left to right, when the dummy units reach feature pattern 112, it is determined that the clearance 140 is not large enough to fit an extra column of dummy units. As a result, a gap 150 is formed between the dummy pattern and feature pattern 112. The change in density due to gap 150 may cause erosion or dishing during a CMP process that is unsuitable for later-stage processes, such as hybrid bonding.

Figure 1B:
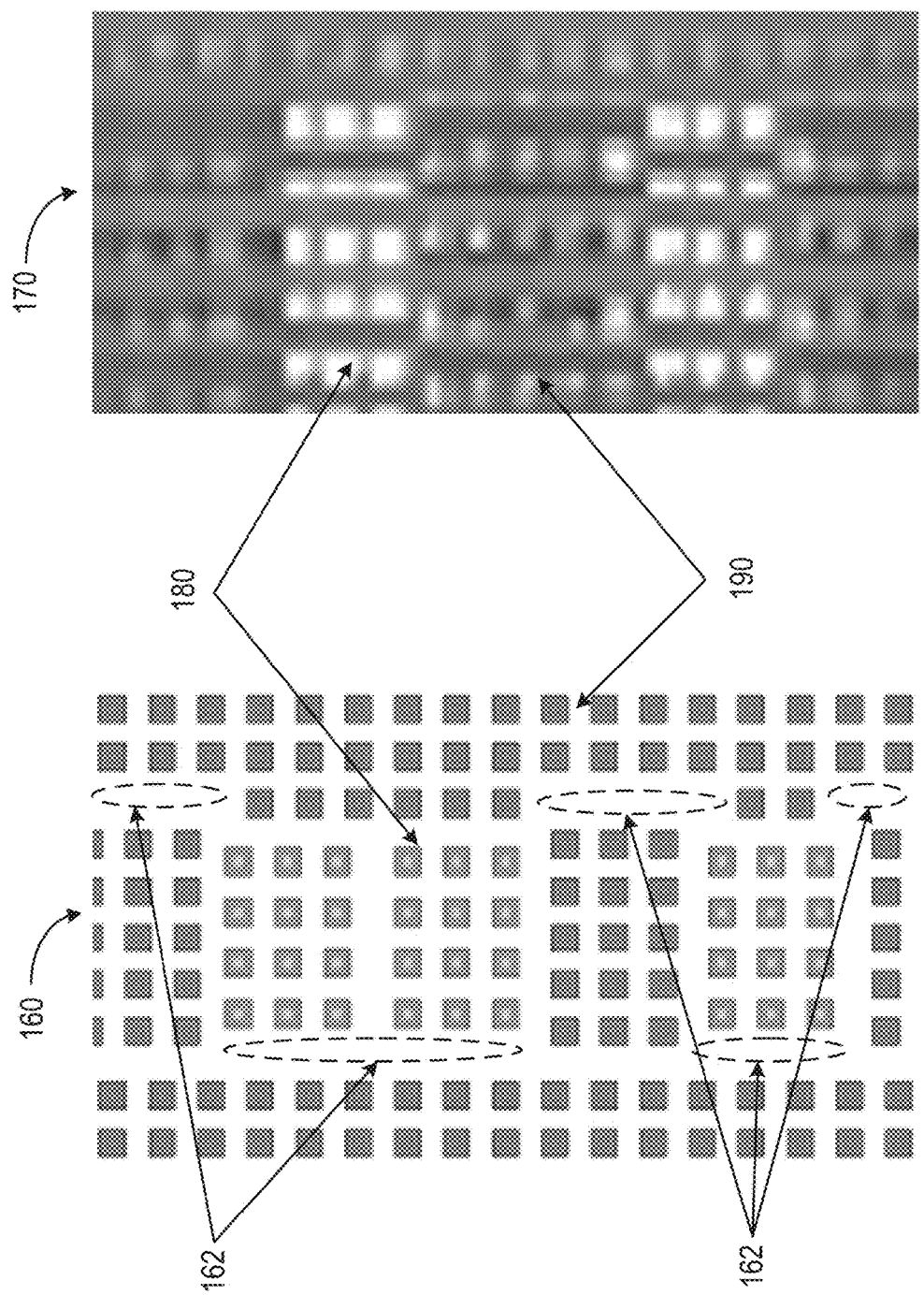
FIG. 1B illustrates an exemplary bonding interface exhibiting surface nonuniformity.

FIG. 1B illustrates an exemplary dummy pattern layout 160 having multiple gaps 162 (thereby causing abrupt density changes) and a resulting bonding interface 170 obtained via atomic force microscopy (AFM). As shown in FIG. 1B, bonding interface 170 exhibits a relatively high degree of nonuniformity, indicated by the high contrast between bright spots (corresponding to feature units 180) and dark spots (corresponding to dummy units 190) throughout the bonding interface. In semiconductor fabrication processes requiring a high degree of uniformity such as hybrid bonding, using bonding interface 170 may not achieve satisfactory bonding performance.

Figure 2:
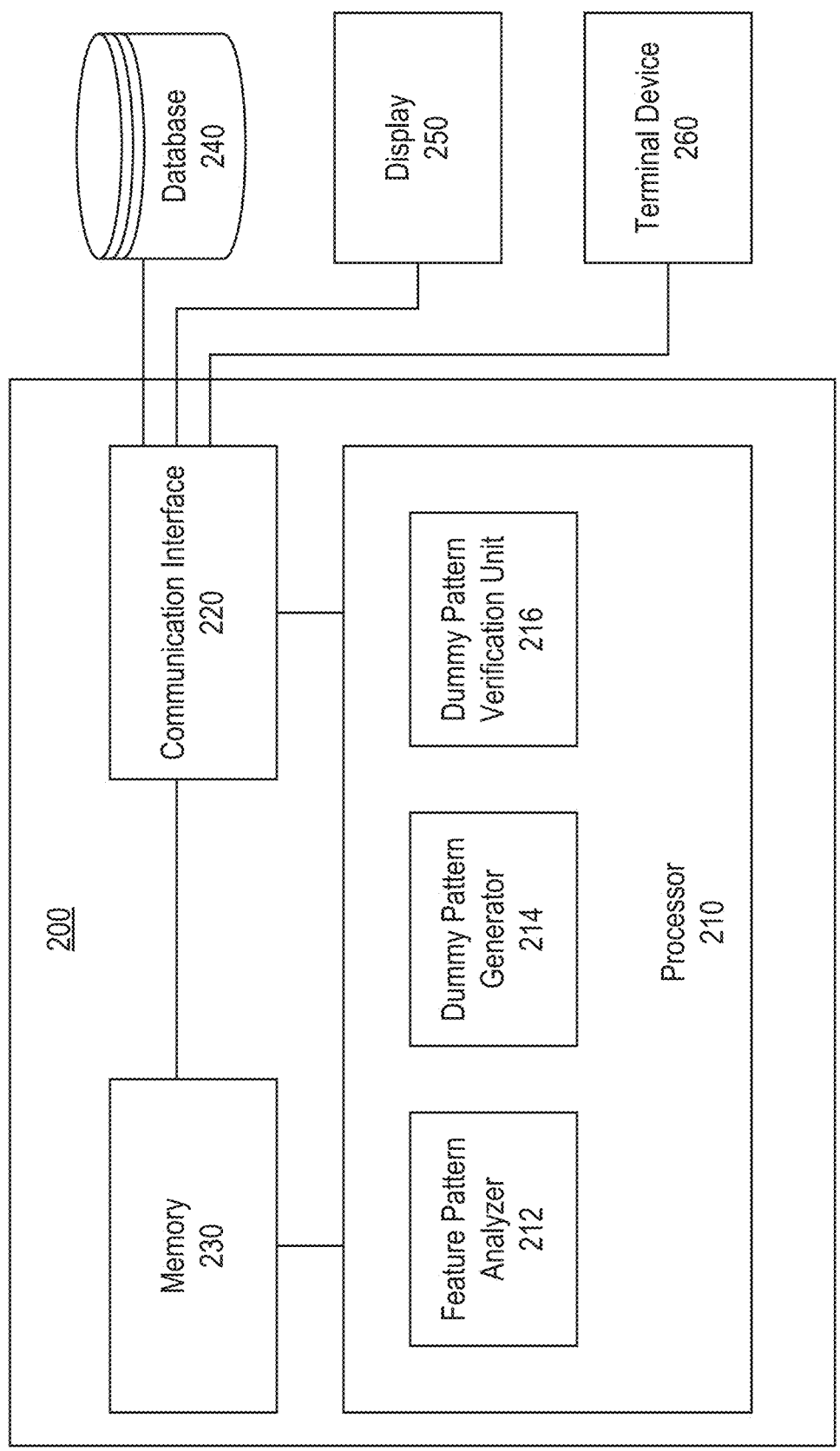
FIG. 2 illustrates a block diagram of an exemplary system for designing a dummy pattern layout, according to some embodiments of the present disclosure.
Figure 3:
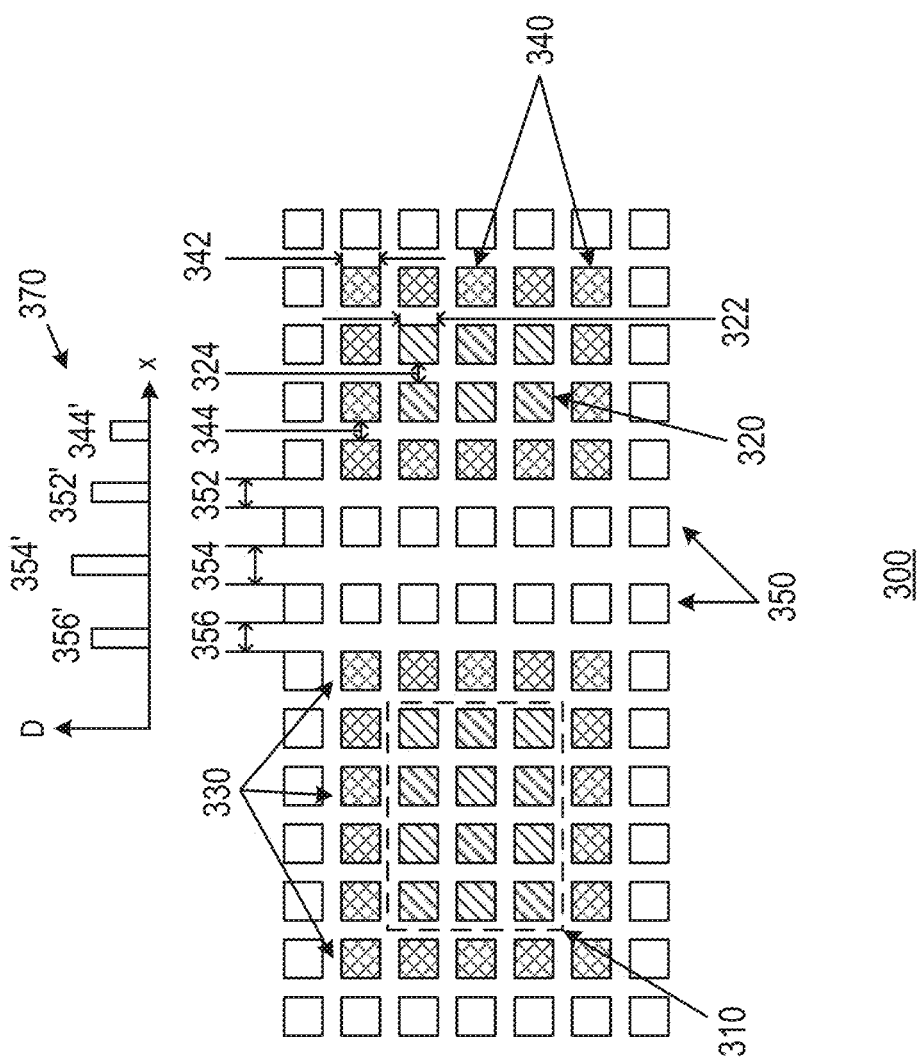
FIG. 3 illustrates an exemplary dummy pattern layout designed using the system of FIG. 2, according to various embodiments of the present disclosure.
Figure 4:
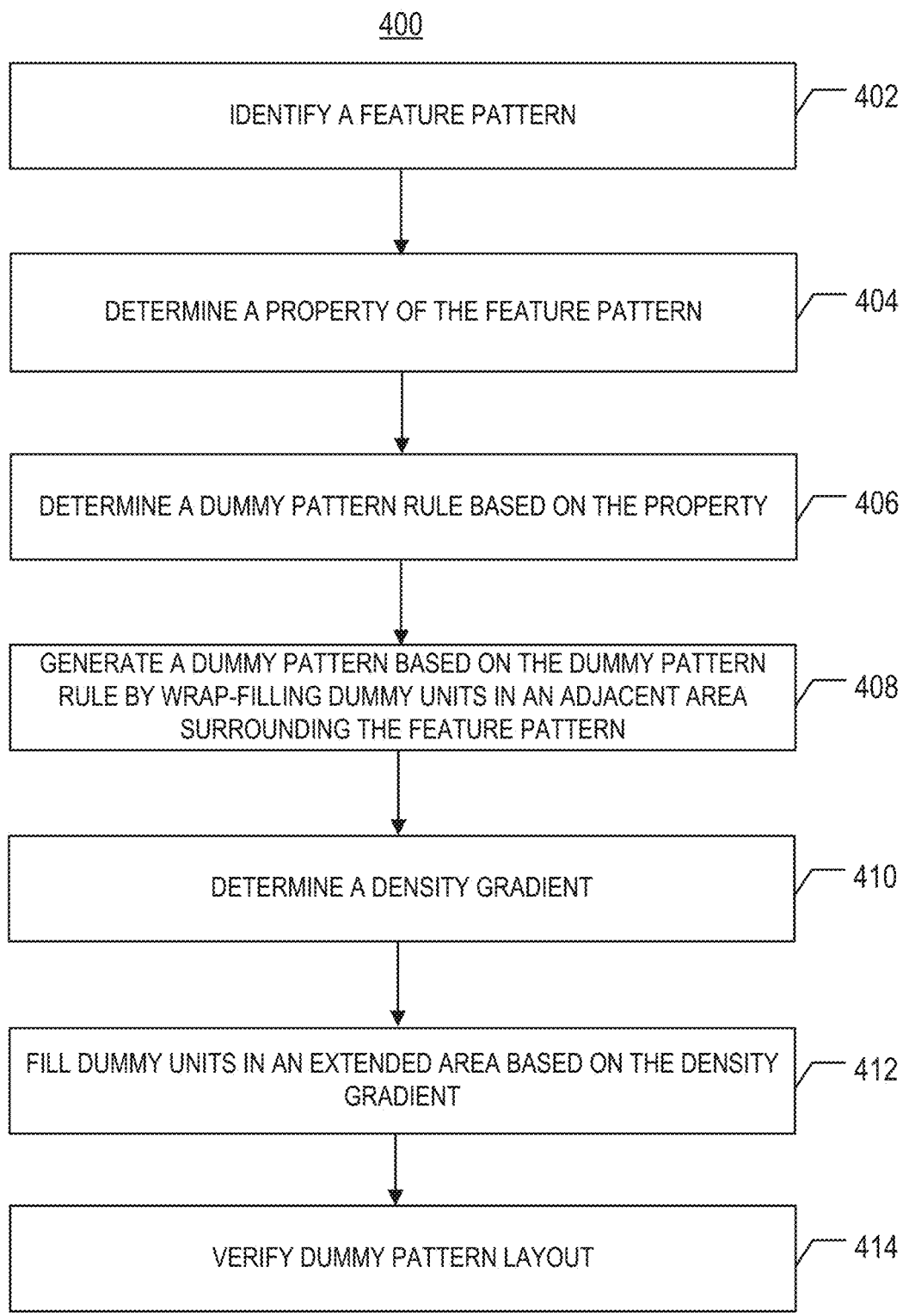
FIG. 4 is a flowchart of an exemplary method for designing a dummy pattern layout, according to some embodiments of the present disclosure.

To alleviate the abrupt density change illustrated in FIGS. 1A and 1B, embodiments of the present disclosure provides systems and methods for designing a dummy pattern layout with controllable density gradients such that the density change is gradual throughout the entire wafer region (e.g., a cell or a chip region) subject to CMP. The block diagram of an exemplary system 200 is shown in FIG. 2. An exemplary dummy pattern layout generated by system 200 is shown in FIG. 3. The flowchart of an exemplary method 400 for designing dummy patterns, such as those shown in FIG. 2, is illustrated in FIG. 4. In the following, FIGS. 2-4 will be described together. It is understood that the operations shown in method 400 are not exhaustive and that other operations can be performed as well before, after, or between any of the illustrated operations. Further, some of the operations may be performed simultaneously, or in a different order than shown in FIG. 4. Systems and methods disclosed herein are applicable to any semiconductor design application that involves wafer surface planarization, such as design-for-manufacturing (DFM), electronic design automation (EDA), semiconductor process simulation, optimization, and/or validation.

Referring to FIG. 2, system 200 may include a memory 230 configured to store one or more computer instructions that, when executed by at least one processor, can cause system 200 to perform various operations disclosed herein. Memory 230 may be any non-transitory type of mass storage, such as volatile or non-volatile, magnetic, semiconductor-based, tape-based, optical, removable, non-removable, or other type of storage device or tangible computer-readable medium including, but not limited to, a ROM, a flash memory, a dynamic RAM, and a static RAM.

System 200 may further include a processor 210 configured to perform the operations in accordance with the instructions stored in memory 230. Processor 210 may include any appropriate type of general-purpose or special-purpose microprocessor, digital signal processor, or microcontroller. Processor 210 may be configured as a separate processor module dedicated to performing one or more specific operations. Alternatively, processor 210 may be configured as a shared processor module for performing other operations unrelated to the one or more specific operations disclosed herein. As shown in FIG. 2, processor 210 may include multiple modules, such as a feature pattern analyzer 212, a dummy pattern generator 214, a dummy pattern verification unit 216, and the like. These modules (and any corresponding sub-modules or sub-units) can be hardware units (e.g., portions of an integrated circuit) of processor 210 designed for use with other components or to execute a part of a program. Although FIG. 2 shows modules 212-216 all within one processor 210, it is contemplated that these modules may be distributed among multiple processors located close to or remotely with each other.

System 200 may also include a communication interface 220. Communication interface 220 may include any type of communication adaptor, such as an integrated services digital network (ISDN) card, cable modem, satellite modem, or a modem to provide a data communication connection. As another example, communication interface 220 may include a local area network (LAN) card to provide a data communication connection to a compatible LAN. Wireless links can also be implemented by communication interface 220. In such an implementation, communication interface 220 can send and receive electrical, electromagnetic or optical signals that carry digital data streams representing various types of information via a network. The network can typically include a cellular communication network, a Wireless Local Area Network (WLAN), a Wide Area Network (WAN), or the like. In some embodiments, communication interface 220 may also include input/output interfaces, such as display interface (e.g., HDMI, DVI, VGA, etc.), audio interface, keyboard interface, mouse interface, printer interface, touch screen interface, etc.

Communication interface 220 may be configured to exchange information between system 200 and one or more other systems/devices. For example, communication interface 220 may communicate with a database 240, which may store information about semiconductor device design and/or fabrication, such as mask information, wafer information, feature pattern information, or the like. In some embodiments, processor 210 may receive information stored in database 240 through communication interface 220. In some embodiments, dummy patterns generated by processor 210 may be sent to database 240 for storage.

In another example, a display 250 may be coupled to system 200 through communication interface 220. Display 250 may include a Liquid Crystal Display (LCD), a Light Emitting Diode Display (LED), a plasma display, or any other type of display, and provide a Graphical User Interface (GUI) presented on the display for user input and data depiction. The display may include a number of different types of materials, such as plastic or glass, and may be touch-sensitive to receive inputs from the user. For example, the display may include a touch-sensitive material that is substantially rigid, such as Gorilla Glass™, or substantially pliable, such as Willow Glass™. In some embodiments, information about feature patterns and/or dummy patterns may be displayed on display 250. In some embodiments, an alert may be triggered and shown on display 250 after one or more operations performed by processor 210 are completed.

In a further example, a terminal device 260 may be coupled to system 200 through communication interface 220. Terminal device 260 may include a desktop computer, a workstation, a laptop computer, a mobile phone, a tablet, a wearable device, or any other type of device configured to perform computational tasks. In some embodiments, a user may use terminal device 260 to control system 200, for example, to initiate, monitor, or terminate operations related to design, analyze, or generate dummy patterns. In some embodiments, terminal device 260 may receive dummy pattern layout generated by system 200. In some embodiments, terminal device 260 may receive notification or alerts indicating the status of operations performed by processor

210. For example, a signal indicating a generated dummy pattern layout passes a validation process may be communicated to terminal device 260 through communication interface 220. In another example, a signal indicating a generated dummy pattern fails the validation process may be communicated to terminal device 260, and terminal device 260 may initiate another dummy pattern design task to generate an alternative layout.

It is noted that one or more of database 240, display 250, and/or terminal device 260 may be part of system 200, and may be co-located with system 200 or located remotely with respect to system 200 and communicated with system 200 via a network or any suitable type of communicate link.

Referring to FIG. 4, method 400 may be performed by processor 210. For example, instructions implementing method 400 may be stored in memory 230 and executed by processor 210. It is contemplated that any step of method 400 can be performed by processor 210 alone or jointly by multiple processors. In the following, processor 210 is used as an example in describing the steps of method 400. Method 400 may include multiple steps, as described below. It is to be appreciated that some of the steps may be optional to perform the embodiments provided herein. Further, some of the steps may be performed simultaneously, or in a different order than shown in FIG. 4.

In step 402, processor 210 may identify a feature pattern corresponding to a functional region of a wafer. For example, processor 210 may receive feature pattern layout information in an area (e.g., a cell) of the wafer from, for example, database 240 through communication interface 220. An exemplary area 300 including feature patterns 310 and 320 is shown in FIG. 3. Area 300 may be a cell or a region that contains functional components of a semiconductor device. In some embodiments, the feature pattern layout information may be contained in an electronic file with a proper format, such as an electronic design automation (EDA) file. After receiving the feature pattern layout information, feature pattern analyzer 212 may analyze the information to identify one or more feature patterns, such as feature patterns 310 and 320 shown in FIG. 3. For example, feature pattern analyzer 212 may identify a feature pattern based on the content of the electronic file, physical layout information, and/or mask information for forming the feature pattern.

After one or more feature patterns are identified by feature pattern analyzer 212, method 400 proceeds to step 404, in which processor 210 may determine a property of the feature pattern. For example, feature pattern analyzer 212 may determine the property of the feature pattern based on a script associated with the feature pattern, such as an EDA script defining the feature pattern. In some embodiments, feature pattern analyzer 212 may analyze the EDA script to determine properties such as the size of a feature unit, the pitch (e.g., distance or clearance) between feature units, a density of the feature pattern, or the like. As shown in FIG. 3, feature pattern analyzer 212 may determine the size 322 of one or more feature units forming feature pattern 320. In another example, feature pattern analyzer 212 may also determine the pitch 324 between adjacent feature units. In a further example, feature pattern analyzer 212 may determine the density of feature pattern 320 (e.g., in terms of the number of feature units per unit area, the number of feature units per unit length, the size and pitch of the feature units, etc.).

In step 406, processor 210 may determine a dummy pattern rule based on the property of the feature pattern. For example, dummy pattern generator 214 may determine a dummy pattern rule based on one or more properties determined by feature pattern analyzer 212. In some embodiments, the dummy pattern rule may include a density of the dummy pattern. For example, based on size 322 and/or pitch 324, dummy pattern generator 214 may determine the density of the feature pattern (e.g., in terms of the number of feature units per unit area, the number of feature units per unit length, the size and pitch of the feature units, etc.). In another example, the density of the feature pattern may be determined by feature pattern analyzer 212 and provided to dummy pattern generator 214. In either case, dummy pattern generator 214 may determine the density of the dummy pattern to be filled in the vacant regions of area 300 based on the density of the feature pattern. In some embodiments, the density of the dummy pattern may be determined to be substantial the same as or close to the density of the feature pattern to ensure gradual change (if at all) or even no substantial change of the density from the feature pattern to the dummy pattern. For example, the difference between the densities of the dummy pattern and the feature pattern may be controlled to be within a predetermined margin (e.g., less than 20%, less than 15%, less than 10%, less than 5%, less than 2%, less than 1%, etc.). In this way, large or abrupt density change may be alleviated or even avoided.

In step 408, dummy pattern generator 214 may generate a dummy pattern corresponding to a vacant region of the wafer by wrap-filling dummy units in an adjacent area surrounding the feature pattern based on the dummy pattern rule. For example, referring to FIG. 3, dummy units 340 (represented by shadowed blocks with crossed shadow lines) may be wrap-filled around feature pattern 320 in the vacant region adjacent to feature pattern 320 such that dummy units 340 wrap around the entire perimeter of feature pattern 320. As used herein, "wrap-filling" refers to a dummy unit filling technique that places dummy units immediately next to the outer boundary of a feature pattern over the entire outer boundary, subject to the dummy pattern rule. In some embodiments, a single loop of dummy units may be used to wrap around the feature pattern. In other embodiments, multiple layers of dummy unit loops may be used to wrap around the feature pattern. Compared to the filling scheme shown in FIG. 1A, the "wrap-filling" technique starts the dummy unit filling processing in close proximity to the feature pattern, thereby ensuring proper clearance to the feature pattern and smooth continuity of the patterns (e.g., at the transition from the feature pattern to the dummy pattern). For example, the size (represented by side length 342) of the wrap-filled dummy units 340 may be kept substantially the same as or close to the size (represented by side length 322) of the feature units in feature pattern 320. In another example, pitch 344 of dummy units 340 may be kept substantially the same as or close to pitch 324 of the feature units in feature pattern 320. In this way, the wrap-filled dummy units 340 act as an extension of the feature units on the outer boundary of the feature pattern 320, with consistent size and/or pitch, thereby maintaining a relatively constant density transition from feature pattern 320 to the wrap-filled dummy pattern.

In some embodiments, multiple feature patterns may be wrap-filled first before filling other remaining vacant regions of the wafer. For example, dummy units 340 may wrap-fill feature pattern 320. Similarly, dummy units 330 may wrap-fill feature pattern 310. After all feature patterns are wrap-filled with dummy units, the remaining vacant regions may then be filled with additional dummy units to form the overall dummy pattern.

In some embodiments, multiple feature patterns may be classified by feature pattern analyzer 212 according to their design-for-manufacturing (DFM) properties (e.g., feature unit size, pitch, density, etc.) into different groups. Each group may be associated with a dummy pattern rule determined by dummy pattern generator 214. Wrap-filling of dummy units may be performed to each group according to the corresponding dummy pattern rule. After all groups of feature patterns have been wrap-filled with dummy units, the remaining vacant regions may then be filled with additional dummy units.

In step 410, processor 210 may determine a density gradient between two feature patterns based on a distance between the two feature patterns and a density difference between the two feature patterns. For example, dummy pattern generator 214 may determine the density gradient indicating a density change of the dummy pattern from the adjacent area (e.g., area of dummy units 340 where the wrap-filling is performed) to an extended area (e.g., area of dummy units 350) further away from feature pattern 320. In some embodiments, the density gradient may be represented by a change of pitch between adjacent dummy units. As shown in FIG. 3, an example density gradient is shown in graph 370, where the vertical axis represents the density D (e.g., in terms of the pitch between adjacent dummy units), and the horizontal axis x represents the distance between feature patterns 310 and 320. The height of stems 344', 352', 354', and 356' indicates the length of the corresponding pitches 344, 352, 354, and 356, respectively. As shown in FIG. 3, pitch 344 in the adjacent area may be substantially the same as or close to the pitch of feature pattern 320. If the same pitch is applied to all the dummy units between feature patterns 310 and 320, it may create a gap between the dummy units when an integer number of dummy units cannot fit within the distance between the two feature patterns. To avoid this situation, the pitch can be gradually increased from the adjacent area toward the extended area, as shown by 344', 352', and 354' in graph 370. The pitch may also be gradually decreased as the dummy units approach feature pattern 310, as shown by 354' and 356' in graph 370. In this way, a gradual change of density can be achieved, avoiding an abrupt change of density.

In some embodiments, the densities of feature patterns 310 and 320 may be different. In this case, a density gradient may be determined to gradually change the density from a first density of feature pattern 310 to a second density of feature pattern 320. For example, assume that the pitch (a density indicator) of feature pattern 310 is 40 (unitless as only the relative value is considered) and the pitch of feature pattern 320 is 80. Assume that the distance between the two feature patterns (less the wrap-filled adjacent areas) can fit 2 dummy units, as shown by dummy units 350 in FIG. 3. Then, the three pitches 356, 354, and 352 can be set to be 50, 60, and 70, to provide a gradual change of pitch from 40 (pitch of feature pattern 310) to 80 (pitch of feature pattern 320). Of course, any method that can achieve a gradual change of density can be used.

In some embodiments, density gradient can also be controlled by changing the size of the dummy units. For example, dummy unit of difference sizes may be used instead of or in conjunction with difference pitches to achieve finer control of the density gradient.

In step 412, processor 210 may fill dummy units in the extended area based on the density gradient. For example, dummy pattern generator 214 may fill dummy units 350 in the reaming vacant area between feature patterns 310 and 320 according to the density gradient (e.g., 356, 354, 352, etc.). In some embodiments, all the remaining vacant regions may be filled with dummy units with controllable density distribution throughout the entire vacant area. It is noted that "filling" of a dummy unit in a vacant area may refer to a design step in which the location, shape, size, or other properties of the dummy unit are determined. The physical dummy unit, however, may or may not be formed on a semiconductor wafer. However, a semiconductor wafer having a dummy pattern layout arranged based on the design generated by the disclosed systems and methods is also within the purview of this disclosure.

In step 414, processor 210 may verify the dummy pattern layout. For example, dummy pattern verification unit 216 may include a semiconductor fabrication process simulator, such as a CMP model, to check the density and topography of the dummy pattern layout generated by dummy pattern generator 214. If the dummy pattern layout passes the verification process, processor 210 may store the dummy pattern layout design in memory 230 and/or database 240. In some embodiments, processor 210 may trigger an alert to notify terminal device 260 and/or display a notification on display 250. On the other hand, if the dummy pattern layout does not pass the verification process, a new dummy pattern design cycle may be initiated to generate a new design or refine or optimize an existing design.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor-based, tape-based, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

Systems and methods disclosed herein reduce the erosion and dishing effects resulting from CMP processing, thereby improving the surface flatness of a wafer hosting semiconductor devices. For example, some embodiments can achieve a single hole dishing less than 30 Å, meeting the strict requirement to interface topography in later processes such as hybrid bonding. By reducing or even eliminating shape changes in pattern density through wrap-filling and imposing limits to density gradient, the disclosed systems and methods can improve the uniformity of wafer surface after CMP processing, thereby improving the bonding performing in fabricating semiconductor devices.

According to one aspect of the present disclosure, a system designing a dummy pattern layout for improving surface flatness of a wafer is provided. The system includes at least one processor and at least one memory. The memory stores instructions that, when executed by the at least one processor, cause the at least one processor to perform operations. The operations include identifying a feature pattern corresponding to a functional region of the wafer. The operations also include determining a property of the feature pattern based on a script associated with the feature pattern. The operations further include determining a dummy pattern rule based on the property of the feature pattern. Moreover, the operations include generating a dummy pattern corresponding to a vacant region of the wafer by wrap-filling dummy units in an adjacent area surrounding the feature pattern based on the dummy pattern rule.

In some embodiments, the dummy pattern rule includes a density of the dummy pattern.

In some embodiments, the operations include determining the density of the dummy pattern based on a density of the feature pattern. A difference between the densities of the dummy pattern and the feature pattern is within a predetermined margin.

In some embodiments, the operations include extending the dummy pattern from the adjacent area to an extended area further away from the feature pattern based on the dummy pattern rule.

In some embodiments, the dummy pattern rule includes a density gradient indicating a density change of the dummy pattern from the adjacent area to the extended area.

In some embodiments, the operations include determining the density gradient based on a distance between the feature pattern and a second feature pattern and a density difference between the feature pattern and the second feature pattern.

In some embodiments, the operations include filling dummy units in the extended area based on the density gradient.

In some embodiments, the property of the feature pattern includes at least one of a size or a pitch of functional units forming the feature pattern.

In some embodiments, the operations include verifying a layout of the dummy pattern using a semiconductor fabrication process simulator.

According to another aspect of the present disclosure, a method for designing a dummy pattern layout for improving surface flatness of a wafer is provided. The method includes identifying a feature pattern corresponding to a functional region of the wafer. The method also includes determining a property of the feature pattern based on a script associated with the feature pattern. The method further includes determining a dummy pattern rule based on the property of the feature pattern. Moreover, the method includes generating a dummy pattern corresponding to a vacant region of the wafer by wrap-filling dummy units in an adjacent area surrounding the feature pattern based on the dummy pattern rule.

In some embodiments, the dummy pattern rule includes a density of the dummy pattern.

In some embodiments, the method includes determining the density of the dummy pattern based on a density of the feature pattern. A difference between the densities of the dummy pattern and the feature pattern is within a predetermined margin.

In some embodiments, the method includes extending the dummy pattern from the adjacent area to an extended area further away from the feature pattern based on the dummy pattern rule.

In some embodiments, the dummy pattern rule includes a density gradient indicating a density change of the dummy pattern from the adjacent area to the extended area.

In some embodiments, the method includes determining the density gradient based on a distance between the feature pattern and a second feature pattern and a density difference between the feature pattern and the second feature pattern.

In some embodiments, the method includes filling dummy units in the extended area based on the density gradient.

In some embodiments, the property of the feature pattern includes at least one of a size or a pitch of functional units forming the feature pattern.

In some embodiments, the method includes verifying a layout of the dummy pattern using a semiconductor fabrication process simulator.

According to yet another aspect of the present disclosure, a non-transitory computer-readable medium is provided. The non-transitory computer-readable medium stores a set of instructions, when executed by at least one processor of an electronic device, cause the electronic device to perform a method for designing a dummy pattern layout for improving surface flatness of a wafer. The method includes identifying a feature pattern corresponding to a functional region of the wafer. The method also includes determining a property of the feature pattern based on a script associated with the feature pattern. The method further includes determining a dummy pattern rule based on the property of the feature pattern. Moreover, the method includes generating a dummy pattern corresponding to a vacant region of the wafer by wrap-filling dummy units in an adjacent area surrounding the feature pattern based on the dummy pattern rule.

In some embodiments, the dummy pattern rule includes a density of the dummy pattern.

In some embodiments, the method includes determining the density of the dummy pattern based on a density of the feature pattern. A difference between the densities of the dummy pattern and the feature pattern is within a predetermined margin.

In some embodiments, the method includes extending the dummy pattern from the adjacent area to an extended area further away from the feature pattern based on the dummy pattern rule.

In some embodiments, the dummy pattern rule includes a density gradient indicating a density change of the dummy pattern from the adjacent area to the extended area.

In some embodiments, the method includes determining the density gradient based on a distance between the feature pattern and a second feature pattern and a density difference between the feature pattern and the second feature pattern.

In some embodiments, the method includes filling dummy units in the extended area based on the density gradient.

In some embodiments, the property of the feature pattern includes at least one of a size or a pitch of functional units forming the feature pattern.

In some embodiments, the method includes verifying a layout of the dummy pattern using a semiconductor fabrication process simulator.

The foregoing description of the specific embodiments will so reveal the general nature of the present disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The Summary and Abstract sections may set forth one or more but not all exemplary embodiments of the present disclosure as contemplated by the inventor(s), and thus, are not intended to limit the present disclosure and the appended claims in any way.

The breadth and scope of the present disclosure should not be limited by any of the above-described exemplary embodiments, but should be defined only in accordance with the following claims and their equivalents.

What is claimed is:

1. A system for designing a dummy pattern layout for improving surface flatness of a wafer, comprising:
at least one processor; and
at least one memory storing instructions that, when executed by the at least one processor, cause the at least one processor to perform operations comprising:
identifying a first feature pattern corresponding to a functional region of the wafer;
determining a property of the first feature pattern based on a script associated with the first feature pattern;
determining a dummy pattern rule based on the property of the first feature pattern;
determining a density gradient based on a distance between the first feature pattern and a second feature pattern and a density difference between the first feature pattern and the second feature pattern;
generating a dummy pattern corresponding to a vacant region of the wafer by wrap-filling dummy units in an adjacent area surrounding the first feature pattern based on the dummy pattern rule; and
extending the dummy pattern from the adjacent area to an extended area further away from the first feature pattern based on the dummy pattern rule,
wherein the dummy pattern rule comprises the density gradient indicating a density change of the dummy pattern from the adjacent area to the extended area.

2. The system of claim 1, wherein the dummy pattern rule comprises a density of the dummy pattern.

3. The system of claim 2, wherein the operations comprise:
determining the density of the dummy pattern based on a density of the first feature pattern, wherein a difference between the densities of the dummy pattern and the first feature pattern is within a predetermined margin.

4. The system of claim 1, wherein the operations comprise:
filling dummy units in the extended area based on the density gradient.

5. The system of claim 1, wherein the property of the first feature pattern comprises at least one of a size or a pitch of feature units forming the first feature pattern.

6. The system of claim 1, wherein the operations comprise:
verifying a layout of the dummy pattern using a semiconductor fabrication process simulator.

7. The system of claim 1, wherein the wrap-filling comprises placing dummy units of the dummy pattern immediately next to an outer boundary of the feature pattern and entirely around the outer boundary, subject to the dummy pattern rule.

8. A method for designing a dummy pattern layout for improving surface flatness of a wafer, comprising:
identifying, by at least one processor, a first feature pattern corresponding to a functional region of the wafer;
determining, by the at least one processor, a property of the first feature pattern based on a script associated with the first feature pattern;
determining, by the at least one processor, a dummy pattern rule based on the property of the first feature pattern;
determining, by the at least one processor, a density gradient based on a distance between the first feature pattern and a second feature pattern and a density difference between the feature pattern and the second feature pattern;
generating, by the at least one processor, a dummy pattern corresponding to a vacant region of the wafer by wrap-filling dummy units in an adjacent area surrounding the first feature pattern based on the dummy pattern rule; and
extending, by the at least one processor, the dummy pattern from the adjacent area to an extended area further away from the feature pattern based on the dummy pattern rule,
wherein the dummy pattern rule comprises a density gradient indicating a density change of the dummy pattern from the adjacent area to the extended area.

9. The method of claim 8, wherein the dummy pattern rule comprises a density of the dummy pattern.

10. The method of claim 9, comprising:
determining, by the at least one processor, the density of the dummy pattern based on a density of the first feature pattern, wherein a difference between the densities of the dummy pattern and the first feature pattern is within a predetermined margin.

11. The method of claim 8, comprising:
filling, by the at least one processor, dummy units in the extended area based on the density gradient.

12. The method of claim 8, wherein the property of the feature pattern comprises at least one of a size or a pitch of feature units forming the first feature pattern.

13. The method of claim 8, comprising:
verifying, by the at least one processor, a layout of the dummy pattern using a semiconductor fabrication process simulator.

14. The method of claim 8, wherein the wrap-filling comprises placing dummy units of the dummy pattern immediately next to an outer boundary of the feature pattern and entirely around the outer boundary, subject to the dummy pattern rule.

15. A non-transitory computer-readable medium that stores a set of instructions, when executed by at least one processor of an electronic device, cause the electronic device to perform a method for designing a dummy pattern layout for improving surface flatness of a wafer, the method comprising:
identifying a first feature pattern corresponding to a functional region of the wafer;
determining a property of the first feature pattern based on a script associated with the first feature pattern;
determining a dummy pattern rule based on the property of the first feature pattern;
determining a density gradient based on a distance between the first feature pattern and a second feature pattern and a density difference between the first feature pattern and the second feature pattern;
generating a dummy pattern corresponding to a vacant region of the wafer by wrap-filling dummy units in an adjacent area surrounding the first feature pattern based on the dummy pattern rule; and extending the dummy pattern from the adjacent area to an extended area further away from the feature pattern based on the dummy pattern rule,
wherein the dummy pattern rule comprises the density gradient indicating a density change of a dummy pattern from the adjacent area to the extended area.

16. The non-transitory computer-readable medium of claim 15, wherein the dummy pattern rule comprises a density of the dummy pattern.

17. The non-transitory computer-readable medium of claim 16, wherein the operations comprise:
determining the density of the dummy pattern based on a density of the first feature pattern, wherein a difference between the densities of the dummy pattern and the first feature pattern is within a predetermined margin.

18. The non-transitory computer-readable medium of claim 15, wherein the operations comprise:
filling dummy units in the extended area based on the density gradient.

19. The non-transitory computer-readable medium of claim 15, wherein the property of the feature pattern comprises at least one of a size or a pitch of feature units forming the first feature pattern.

20. The non-transitory computer-readable medium of claim 15, wherein the operations comprise:
verifying a layout of the dummy pattern using a semiconductor fabrication process simulator.

\* \* \* \* \*